United States Patent Office 2,891,079
Patented June 16, 1959

2,891,079

6-METHYL-4,6-PREGNADIENE-3,20-DIONE AND 17α-ACYLOXY DERIVATIVES THEREOF

Raymond M. Dodson, Park Ridge, and Paul B. Sollman, Skokie, Ill., assignors to G. D. Searle & Co., Chicago, Ill., a corporation of Delaware No Drawing. Application January 23, 1959
Serial No. 788,497

2 Claims. (Cl. 260—397.4)

The present invention relates to a new group of highly potent progestational agents and, more particularly, to the compounds of the structural formula

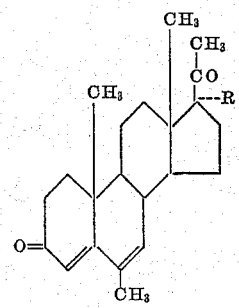

wherein R is a member of the class consisting of hydrogen and such lower alkyl-COO radicals as acetoxy, propionoxy, butyroxy, pentanoyloxy, and hexanoyloxy.

The compounds of this application have a specific advantage over the corresponding compounds lacking the unsaturated linkage between carbons-6 and 7. They do not have some of the toxic side reactions limiting the usefulness of the corresponding progesterone derivatives, especially the toxic reaction on the adrenal glands. The compounds are also estrogen antagonists.

The compounds of this invention are conveniently prepared from the corresponding derivatives lacking the Δ6-unsaturation by heating with chloranil and a catalytic quantity of such acid catalysts as benzene-sulfonic or p-toluenesulfonic acid in an organic solvent, suitably an aromatic hydrocarbon such as benzene, toluene, or xylene.

The invention will appear in further detail from the examples set forth herein but should not be construed as limited thereby either in spirit or in scope.

Example 1

A mixture of 1 part of 6α-methylprogesterone, 1 part of chloranil and 0.025 part of the monohydrate of p-toluenesulfonic acid is refluxed for 3 hours in 90 parts of xylene. The solution is then cooled and applied to a chromatography column containing 50 parts of silica gel. The column is developed with benzene and then with benzene solutions containing increasing amounts of ethyl acetate. On elution with a 10% solution of ethyl acetate in benzene and concentration of the eluate there is obtained 6-methyl-4,6-pregnadien-3,20-dione melting at about 155–156° C. The ultraviolet absorption spectrum shows a maximum at about 290 millimicrons with a molecular extinction coefficient of about 24,300. Infrared maxima are observed at about 3.38, 3.47, 5.84, 5.98, 6.14, and 6.31 microns. The specific rotation of the 1% chloroform solution is +174°.

Example 2

A mixture of 1 part of 6α-methyl-17α-hydroxy-4-pregnene-3,20-dione, 1 part of chloranil, 0.025 part of the monohydrate of p-toluenesulfonic acid and 90 parts of xylene is heated and refluxed for 2 hours and then cooled and applied to a chromatography column containing 60 parts of silica gel. The column is developed with benzene and increasing concentrations of ethyl acetate in benzene. Elution with a 20% solution of ethyl acetate in benzene, concentration of the eluate and recrystallization from a mixture of acetone and petroleum ether yields 6-methyl-17α-hydroxy-4,6-pregnadiene-3,20-dione melting at about 208.5–213.5°. The ultraviolet absorption spectrum shows a maximum at 289.5 millimicrons with a molecular extinction coefficient of about 23,600. Infrared maxima are observed at about 2.83, 5.82, 6.04, 6.12, and 6.32 microns.

Example 3

To a solution of 1.04 parts of 6-methyl-17α-hydroxy-4,6-pregnadiene-3,20-dione in 105 parts of acetic acid are added 0.8 part of p-toluenesulfonic acid monohydrate and 10.5 parts of acetic anhydride. After standing at room temperature for 12 hours the solution is poured into 1000 parts of ice water and the resulting precipitate is collected on a filter. Successive crystallizations from a mixture of acetone and petroleum ether, then from methanol yield 6-methyl-17α-acetoxy-4,6-pregnadiene-3,20-dione melting at about 219–221°. The ultraviolet absorption spectrum shows a maximum at 288 millimicrons with a molecular extinction coefficient of about 23,800. Infrared maxima are observed about 5.75, 5.83, 6.00, 6.12, 6.31, 7.92, and 8.01 microns.

Example 4

To a solution of 1 part of 6-methyl-17α-hydroxy-4,6-pregnadiene-3,20-dione in 100 parts of caproic acid are added 0.8 part of p-toluenesulfonic acid monohydrate and 21 parts of caproic anhydride. The mixture is maintained at room temperature for 12 hours and then poured into ice water. The resulting precipitate is collected on a filter and recrystallized from a mixture of acetone and petroleum ether, and from methanol to yield 6-methyl-17α-hexanoyloxy-4,6-pregnadiene-3,20-dione. The ultraviolet absorption spectrum shows a maximum at about 288 millimicrons with a molecular extinction coefficient of about 24,100. Infrared maxima are observed at about 5.76, 5.84, 6.00, 6.15, 6.31, and 8.50 microns.

Example 5

A mixture of 1 part of 6α-methyl-17α-acetoxy-4-pregnene-3,20-dione, 1 part of chloranil, 0.025 part of the monohydrate of p-toluenesulfonic acid and 90 parts of xylene is refluxed for 4 hours and then applied to a column containing 55 parts of silica gel. The column is developed with benzene and then with benzene solutions containing increasing concentrations of ethyl acetate. Elution with a 10% solution of ethyl acetate in benzene, concentration of the eluate and crystallization from aqueous methanol yields 6-methyl-17α-acetoxy-4,6-pregnadiene-3,20-dione melting at about 221–222° C. The specific rotation of the chloroform solution is +11.8°.

What is claimed is:
1. A compound of the structural formula
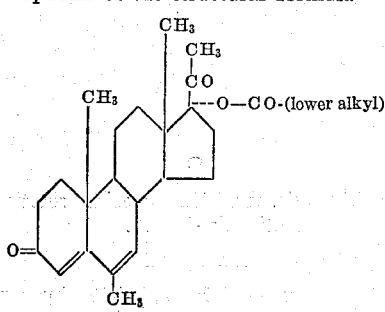
2. 6-methyl-17α-acetoxy-4,6-pregnadiene-3,20-dione.
References Cited in the file of this patent
UNITED STATES PATENTS
2,739,974    Colton _____ Mar. 27, 1956